United States Patent
Li et al.

(10) Patent No.: US 11,756,276 B2
(45) Date of Patent: Sep. 12, 2023

(54) IMAGE PROCESSING METHOD AND APPARATUS FOR AUGMENTED REALITY, ELECTRONIC DEVICE, AND STORAGE MEDIUM

(71) Applicants: BEIJING BYTEDANCE NETWORK TECHNOLOGY CO., LTD., Beijing (CN); BYTEDANCE INC., Los Angeles, CA (US)

(72) Inventors: Yunzhu Li, Los Angeles, CA (US); Jingcong Zhang, Los Angeles, CA (US); Xuchen Song, Los Angeles, CA (US); Jianchao Yang, Los Angeles, CA (US); Guohui Wang, Los Angeles, CA (US); Zhili Chen, Los Angeles, CA (US); Linjie Luo, Los Angeles, CA (US); Xiao Yang, Los Angeles, CA (US); Haoze Li, Los Angeles, CA (US); Jing Liu, Los Angeles, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/053,476

(22) Filed: Nov. 8, 2022

(65) Prior Publication Data
US 2023/0061012 A1 Mar. 2, 2023

Related U.S. Application Data

(63) Continuation of application No. PCT/CN2021/098456, filed on Jun. 4, 2021.

(30) Foreign Application Priority Data

Jul. 10, 2020 (CN) .......................... 202010662819.X

(51) Int. Cl.
*G06T 19/00* (2011.01)
*G06V 40/16* (2022.01)
(Continued)

(52) U.S. Cl.
CPC ............ *G06T 19/006* (2013.01); *G06T 19/20* (2013.01); *G06V 40/174* (2022.01); *G06V 40/20* (2022.01); *G10L 15/02* (2013.01); *G10L 25/63* (2013.01); *G06T 2219/2012* (2013.01); *G06T 2219/2021* (2013.01); *G06V 2201/07* (2022.01)

(58) Field of Classification Search
None
See application file for complete search history.

(56) References Cited

U.S. PATENT DOCUMENTS 10,789,749 B2 * 9/2020 Canberk .................. G06T 19/20
10,924,875 B2 * 2/2021 Settel ........................ G06F 3/16
(Continued)

FOREIGN PATENT DOCUMENTS

| CN | 103544724 A | 1/2014 |
|---|---|---|
| CN | 105608745 A | 5/2016 |

(Continued)

OTHER PUBLICATIONS

Schertenleib, Sebastien, et al. "Conducting a virtual orchestra." IEEE MultiMedia 11.3 (2004): 40-49. (Year: 2004).*
(Continued)

*Primary Examiner* — Ryan M Gray
(74) *Attorney, Agent, or Firm* — Alleman Hall Creasman & Tuttle LLP

(57) ABSTRACT

An image processing method and apparatus for augmented reality, an electronic device and a storage medium, including: acquiring a target image in response to an image acquiring instruction triggered by a user, where the target image includes a target object; acquiring an augmented reality model of the target object, and outputting the aug-
(Continued)

mented reality model in combination with the target object; acquiring target audio data selected by the user, and determining an audio feature with temporal regularity according to the target audio data; and driving the augmented reality model according to the audio feature and a playing progress of the target audio data when outputting the target audio data.

16 Claims, 2 Drawing Sheets

(51) Int. Cl.
*G06V 40/20* (2022.01)
*G06T 19/20* (2011.01)
*G10L 15/02* (2006.01)
*G10L 25/63* (2013.01)

(56) References Cited

U.S. PATENT DOCUMENTS

| | | | |
|---|---|---|---|
| 11,232,645 B1 * | 1/2022 | Roche | G06V 20/20 |
| 11,588,897 B2 * | 2/2023 | Berliner | G06T 7/70 |
| 2014/0028712 A1 * | 1/2014 | Keating | G06T 19/006 |
| | | | 345/633 |
| 2020/0380031 A1 * | 12/2020 | Zhou | G06F 16/7834 |
| 2021/0019346 A1 * | 1/2021 | Wu | G06F 16/638 |

FOREIGN PATENT DOCUMENTS

| | | |
|---|---|---|
| CN | 106506464 A | 3/2017 |
| CN | 109407918 A | 3/2019 |
| CN | 111833460 A | 10/2020 |
| WO | 2019029100 A1 | 2/2019 |
| WO | 2020007185 A1 | 1/2020 |

OTHER PUBLICATIONS

Thielen, Elisabeth, et al. "Bringing a virtual string quartet to life." Proceedings of the Second African Conference for Human Computer Interaction: Thriving Communities. 2018. (Year: 2018).*

ISA China Patent Office, International Search Report and Written Opinion issued in Application No. PCT/CN2021/098456, dated Sep. 3, 2021, WIPO, 11 pages.

China National Intellectual Property Administration, Office Action and Search Report Issued in Application No. 202010662819.X, dated Jul. 20, 2023, 8 pages. Submitted with partial English translation.

* cited by examiner

IMAGE PROCESSING METHOD AND APPARATUS FOR AUGMENTED REALITY, ELECTRONIC DEVICE, AND STORAGE MEDIUM

CROSS-REFERENCE TO RELATED APPLICATIONS

The present application is a continuation of International Application No. PCT/CN2021/098456, filed on Jun. 4, 2021, which claims priority to Chinese patent application No. 202010662819.X, filed on Jul. 10, 2020, both of which are hereby incorporated by reference in their entireties.

TECHNICAL FIELD

Embodiments of the present disclosure relate to a virtual reality technology, and in particular, to an image processing method and apparatus for augmented reality, an electronic device, and a storage medium.

BACKGROUND

Augmented Reality (AR for short) is a technology of superimposing real information with virtual information. Firstly, a computer system processes the real information, and generates, according to the real information, the virtual information that is matching and contains a virtual object, sound or a text, and then, superimposes the virtual information on a human-computer interaction interface that displays the real information, thereby enhancing a user's perception of the real world.

At present, an augmented reality model can only be displayed in a preset fixed way, such way of displaying is dull and lacks interactivity, thus rendering it poor in usability.

SUMMARY

The present disclosure provides an image processing method and apparatus for augmented reality, an electronic device and a storage medium, so as to improve interactivity and usability of an augmented reality model.

In a first aspect, an embodiment of the present disclosure provides an image processing method for augmented reality, including:

acquiring a target image in response to an image acquiring instruction triggered by a user, where the target image includes a target object;

acquiring an augmented reality model of the target object, and outputting the augmented reality model in combination with the target object;

acquiring target audio data selected by the user, and determining an audio feature with temporal regularity according to the target audio data; and driving the augmented reality model according to the audio feature and a playing progress of the target audio data when outputting the target audio data.

In a second aspect, an embodiment of the present disclosure further provides an image processing apparatus for augmented reality, including:

a target image acquiring module, configured to acquire a target image in response to an image acquiring instruction triggered by a user, where the target image includes a target object;

an augmented reality model acquiring module, configured to acquire an augmented reality model of the target object and output the augmented reality model in combination with the target object;

a target audio acquiring module, configured to acquire target audio data selected by the user;

an audio feature determining module, configured to determine an audio feature with temporal regularity according to the target audio data; and an outputting module, configured to drive the augmented reality model according to the audio feature and a playing progress of the target audio data when outputting the target audio data.

In a third aspect, an embodiment of the present disclosure further provides an electronic device, including:

one or more processors;

a storage, configured to store one or more programs, the one or more programs, when executed by the one or more processors, cause the one or more processors to implement the image processing method for augmented reality as illustrated in the embodiments of the present disclosure.

In a fourth aspect, an embodiment of the present disclosure further provides a storage medium having computer executable instructions thereon, the computer executable instructions, when executed by a computer processor, are configured to execute the image processing method for augmented reality as illustrated in the embodiments of the present disclosure.

In a fifth aspect, an embodiment of the present disclosure further provides a computer program product which includes a computer program stored in a readable storage medium, from which one or more processors of an electronic device can read the computer program, and the computer program, when executed by the one or more processors, causes the electronic device to execute the image processing method for augmented reality as illustrated in embodiments of the present disclosure.

In a sixth aspect, an embodiment of the present disclosure further provides a computer program stored in a readable storage medium, from which one or more processors of an electronic device can read the computer program, and the computer program, when executed by the one or more processors, causes the electronic device to execute the image processing method for augmented reality as illustrated in the embodiments of the present disclosure.

According to the image processing scheme for augmented reality disclosed in the embodiments of the present disclosure, a target image can be acquired in response to an image acquiring instruction triggered by a user, where the target image includes a target object; an augmented reality model of the target object is acquired, and the augmented reality model is output in combination with the target object; target audio data selected by the user is acquired, and an audio feature with temporal regularity is determined according to the target audio data; the augmented reality model is driven according to the audio feature and a playing progress of the target audio data when the target audio data is output. Compared with the current augmented reality model which lacks interactivity and is poor in usability, according to the image processing scheme for augmented reality disclosed in the embodiments of the present disclosure, an output of the augmented reality model can be driven by combining the audio feature of the target audio data selected by the user when the augmented reality model is output, so that the user can participate in a display process of the augmented reality model. By selecting different target audio data, the augmented reality model is driven to be displayed according to the audio feature of the target audio data, thus improving the usability.

DESCRIPTION OF EMBODIMENTS

The present disclosure will be further explained in detail with reference to the drawings and examples below. It is to be understood that the specific embodiments described herein are only for explaining the present disclosure, but not for limiting the present disclosure. In addition, it should be noted that, for the convenience of description, the drawings only show some of the parts related to the present disclosure, but not all of them.

Embodiment 1

Figure 1:
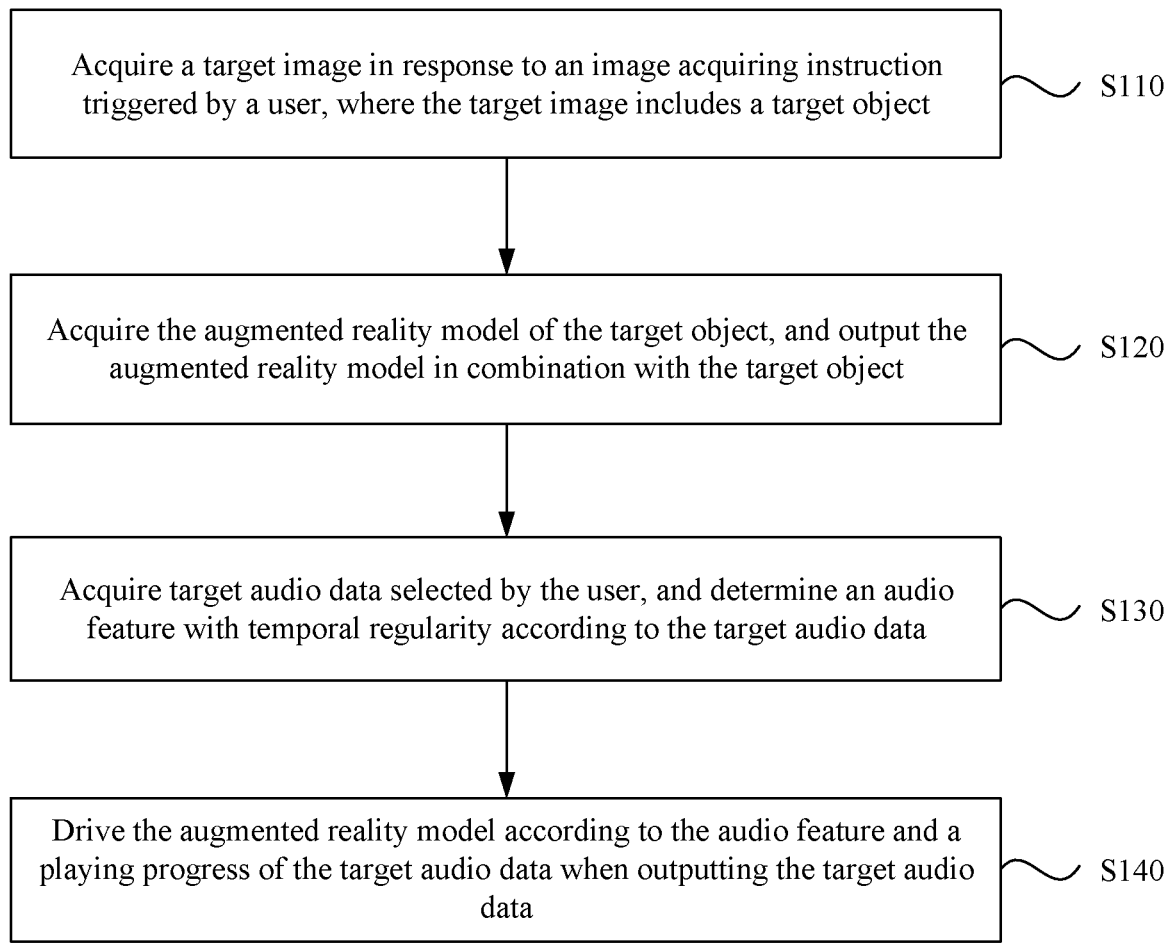
FIG. 1 is a flowchart of an image processing method for augmented reality in the first embodiment of the present disclosure.

FIG. 1 is a flow chart of an image processing method for augmented reality provided in a first embodiment of the present disclosure. This embodiment may be applied to a situation of displaying an augmented reality model, and the method may be executed by an electronic device for implementing the augmented reality, which may be a smart phone, a tablet computer, etc., and the method includes the following steps:

step 110: acquiring a target image in response to an image acquiring instruction triggered by a user, where the target image includes a target object.

The user may issue the image acquiring instruction in a preset application, and when the user issues the image acquiring instruction, the electronic device acquires the target image through a camera. The user may start the preset application on the premise that he intended to use the augmented reality model, and uses the electronic device to take a picture of the target object. The target object may be an object with an augmented reality model such as a landmark building. The Landmark may be a building in a unique design style in a certain area.

The preset application may be a camera application of the electronic device or an application with an augmented reality function. The camera of the electronic device acquires the target image, and the electronic device displays the acquired target image on a preview page. The preview page may provide the user with a real-time image captured by the camera.

Step 120: acquiring the augmented reality model of the target object, and outputting the augmented reality model in combination with the target object.

If it is recognized that there is an augmented reality model corresponding to the photographed object in the current image, the augmented reality model is mapped to the target object in the target image, thus enabling the augmented reality model to be output in combination with the target object.

Further, an interface may be provided for the user to manually adjust a size of the augmented reality model. If a combination effect of the machine is not good, for example, the augmented reality model cannot be accurately combined with the target object, the size of the augmented reality model may be adjusted through this interface, so that the size of the augmented reality model may be adjusted by the user and the usability may be improved.

Further, in an implementation, when the target object is a landmark building, where acquiring the augmented reality model of the target object may be implemented in the following ways:

when it is detected that the target image contains a building, determining an identifier of the target object according to current position information and a shooting angle of the electronic device, and determining an augmented reality model represented by the identifier of the target object as the augmented reality model of the target object.

Global positioning system (GPS) positioning information of the electronic device is acquired. Orientation of the electronic device is acquired by a gyroscope, and the orientation is taken as the shooting angle. It is determined whether there is a landmark building in a certain shooting range according to the positioning information and the shooting angle. If there is the landmark building, an augmented reality model of the landmark building is taken as the augmented reality model of the target object.

Further, in another implementation, where acquiring the augmented reality model of the target object may be implemented in the following ways:

determining a basic image of the target object from the target image, and determining the augmented reality model of the target object according to the basic image. The base image may be an image of the target object in the target image. A network server may analyze the basic image, and then determine what the target object in the basic image is. The target object may be a building, a vehicle, clothing, a shoe, a hat, and the like.

The above two implementations may be used to detect the augmented reality model of the target object, and may also be used to check whether the augmented reality model of the target object is accurate.

Step 130: acquiring target audio data selected by the user, and determining an audio feature with temporal regularity according to the target audio data.

The target audio data may be audio data such as a song or a piece of recording selected by the user. The above audio data may be locally stored audio data. It may also be audio data selected by the user in a song list provided by a server. The target audio data may also be audio data input by the user in real time.

In an implementation, audio feature detection is performed on the target audio data to obtain the audio feature with temporal regularity of the target audio data, and the audio feature includes a combination of one or more of stress, downbeat or beat.

Audio feature detection is used to analyze a beat rule, the stress, a position or a rule of the downbeat in the target audio data. The beat is a unit that represents the rhythm of the target audio data. In the target audio data, a series of beats with certain strengths and weaknesses appear repeatedly at regular intervals, such as 2/4 beat (two fourths), 4/4 beat (four fourths), 3/4 beat (three fourths), etc. The beat changes periodically with time. The stress is a note with higher volume in the target audio. The downbeat refers to a strong beat in the beat.

Step 140: driving the augmented reality model according to the audio feature and a playing progress of the target audio data when outputting the target audio data.

When the user selects the target audio data, an audio outputting module of the electronic device outputs the target audio data. The augmented reality model is driven according to the current playing progress and the audio feature at the same time of outputting the target audio data.

Exemplary, with the appearance of stress, upbeat or downbeat, the overall color of the augmented reality model may be driven to change. The color changes corresponding to the downbeat, the upbeat or the stress are different.

In an implementation, the augmented reality model includes a plurality of model units. Where driving the augmented reality model according to the audio feature and the playing progress of the target audio data includes driving the model units in the augmented reality model according to the audio feature and the playing progress of the target audio data.

The augmented reality model may be composed of a plurality of model units, and each model unit may be a cube unit. The plurality of cube units are spliced to form the augmented reality model of the target object. The plurality of cube units may be processed in parallel through a shader. The model units in the augmented reality model are driven according to the audio feature and the playing progress of the target audio data.

In an implementation, where driving the model units in the augmented reality model according to the audio feature and the playing progress of the target audio data includes:

step 1: determining target time and a target amplitude for a morphological change of the model unit according to the audio feature with temporal regularity.

The time of the upbeat, the downbeat and the stress may be determined as the target time, and the target amplitudes may be determined according to the degrees of the upbeat, the downbeat and the stress.

Step 2, driving the model unit in the augmented reality model according to the target amplitude if the playing progress of the target audio data is the target time.

A driving mode of the model unit may include a bulge action, color changing or transparency changing, etc.

Exemplary, where driving the model unit in the augmented reality model according to the target amplitude includes:

driving a preset model unit in the augmented reality model to perform the bulge action; or driving a plurality of model units in the augmented reality model to perform the color changing; or driving a plurality model units in the augmented reality model to perform the transparency changing.

When driving the preset model unit in the augmented reality model to perform the bulge action, the preset model may be a randomly selected model unit. A bulge amplitude of the bulge action is determined according to the target amplitude. When driving the plurality of model units in the augmented reality model to perform the color changing, the plurality of model units are randomly select from all of the model units to perform the color changing or the color changing may be performed on all of the model units. Transparency refers to the transparency of a texture image of the model unit. The texture image may be a solid color or an actual texture pattern of the target object.

Further, after acquiring the target audio data selected by the user, the method further includes:

acquiring an emotional feature of the target audio data; determining a first deformation feature of the augmented reality model according to the emotional feature, where the first deformation feature is used to drive a shape of the augmented reality model to be consistent with emotion expressed by the emotional feature; driving the augmented reality model according to the first deformation feature when outputting the target audio data.

The emotional feature may be determined according to a song name of the target audio data, or may be determined according to text content entered by the user into the target audio. The emotional feature is used to indicate what the emotion of the audio content of the target audio data tend to express, such as cheerfulness, glumness, etc. The deformation features corresponding to different emotional features may be configured in advance. For example, in the first deformation feature corresponding to a cheerful emotional feature, the bulge amplitude of the model unit is higher and a bulge frequency of the model unit is faster. For example, in the first deformation feature corresponding to a glum emotional feature, the bulge amplitude of the model unit is lower and the bulge frequency of the model unit is slower. For example, after photographing a TV tower, if the emotional feature is sadness, the TV tower model is presented as being bent over. If a building model is deformed, an original image of the building is deleted by clipping, and the original image area is covered by using the model.

Further, after acquiring the target audio data selected by the user, further includes:

acquiring a body movement or an expression of the user; determining a second deformation feature of the augmented reality model according to the body movement or the expression, where the second deformation feature is used to drive a shape of the augmented reality model to be consistent with the body movement or the expression; driving the augmented reality model according to the second deformation feature when outputting the target audio data.

The body movement of the user may be obtained through body detection. The expression of the user may be obtained through face recognition. The second deformation feature is generated according to the body movement or the expression. Exemplarily, after the TV tower is photographed, if the facial expression is sad, the second deformation feature is bending over, and the TV tower model is presented as being bent over at this time. If the building model is deformed, the original image of the building is deleted by clipping, and the original image area is covered by using the model.

According to the image processing method for augmented reality disclosed in the embodiments of the present application, a target image is acquired in response to an image acquiring instruction triggered by a user, where the target image includes a target object; an augmented reality model of the target object is acquired, and the augmented reality model is output in combination with the target object; target audio data selected by the user is acquired, and an audio feature with temporal regularity is determined according to the target audio data; the augmented reality model is driven according to the audio feature and a playing progress of the target audio data when the target audio data is output. Compared with the current augmented reality model which lacks interactivity and is poor in usability, according to the image processing scheme for augmented reality disclosed in the embodiment of the present application, an output of the augmented reality model can be driven by combining the audio feature of the target audio data selected by the user when the augmented reality model is output, so that the user can participate in a display process of the augmented reality model. By selecting different target audio data, the augmented reality model is driven to be displayed according to the audio feature of the target audio data, thus improving the usability.

Embodiment 2

Figure 2:
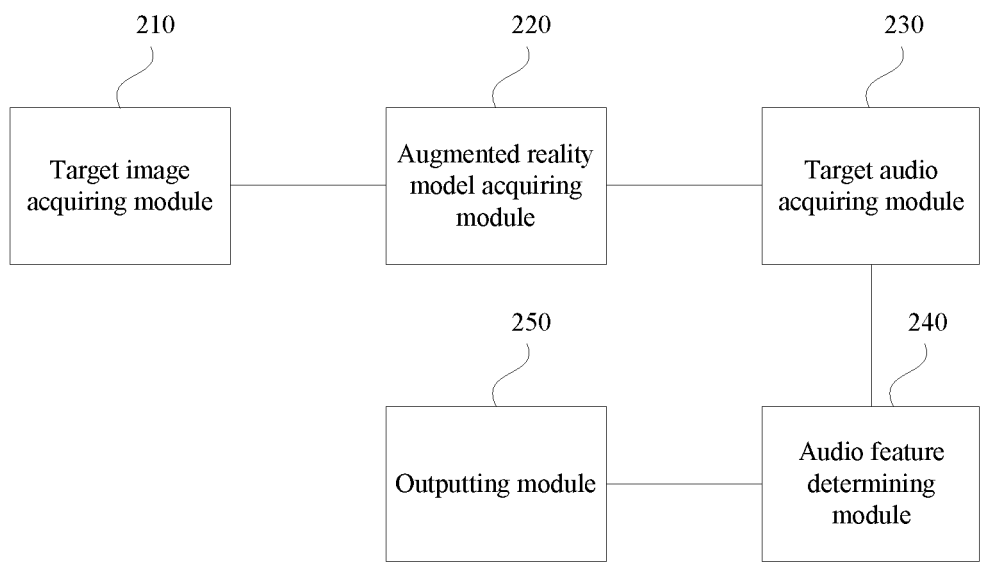
FIG. 2 is a schematic structural diagram of an image processing apparatus for augmented reality in the second embodiment of the present disclosure.

FIG. 2 is a schematic structural diagram of an image processing apparatus for augmented reality provided by a second embodiment of the present disclosure. This embodiment may be applied to the situation of displaying the augmented reality model. The apparatus includes a target image acquiring module 210, an augmented reality model acquiring module 220, a target audio acquiring module 230, an audio feature determining module 240 or an outputting module 250;

the target image acquiring module 210 is configured to acquire a target image in response to an image acquiring instruction triggered by a user, where the target image includes a target object;

the augmented reality model acquiring module 220 is configured to acquire an augmented reality model of the target object, and output the augmented reality model in combination with the target object;

the target audio acquiring module 230 is configured to acquire target audio data selected by the user;

the audio feature determining module 240 is configured to determine an audio feature with temporal regularity according to the target audio data;

the outputting module 250 is configured to drive the augmented reality model according to the audio feature and a playing progress of the target audio data when outputting the target audio data.

Further, the audio feature determining module 240 is configured to:

perform audio feature detection on the target audio data to obtain the audio feature with temporal regularity of the target audio data, where the audio feature includes a combination of one or more of stress, downbeat or beat.

Further, the augmented reality model includes a plurality of model units, and the outputting module 250 is configured to:

drive the model units in the augmented reality model according to the audio feature and the playing progress of the target audio data.

Further, the outputting module 250 is configured to:

determine target time and a target amplitude for a morphological change of the model unit according to the audio feature with temporal regularity;

drive the model unit in the augmented reality model according to the target amplitude if the playing progress of the target audio data is the target time.

Further, the outputting module 250 is configured to:

drive a preset model unit in the augmented reality model to perform a bulge action; or, drive a plurality of model units in the augmented reality model to perform color changing; or drive a plurality of model units in the augmented reality model to perform transparency changing.

Further, the apparatus also includes a first deformation feature acquiring module. The first deformation feature acquiring module is configured to:

acquire an emotional feature of the target audio data;

determine a first deformation feature of the augmented reality model according to the emotional feature, where the first deformation feature is used to drive a shape of the augmented reality model to be consistent with emotion expressed by the emotional feature;

drive the augmented reality model according to the first deformation feature when outputting the target audio data.

Further, the apparatus also includes a second deformation feature acquiring module. The second deformation feature acquiring module is configured to:

acquire a body movement or an expression of the user;

determine a second deformation feature of the augmented reality model according to the body movement or the expression, where the second deformation feature is used to drive a shape of the augmented reality model to be consistent with the body movement or the expression;

drive the augmented reality model according to the second deformation feature when outputting the target audio data.

In the image processing apparatus for augmented reality disclosed in the embodiments of the present disclosure, the target image acquiring module 210 acquires a target image in response to an image acquiring instruction triggered by a user, where the target image includes a target object; the augmented reality model acquiring module 220 acquires an augmented reality model of the target object, and outputs the augmented reality model in combination with the target object; the target audio acquiring module 230 acquires target audio data selected by the user, the audio feature determining module 240 determines an audio feature with temporal regularity according to the target audio data, and the outputting module 250 drives the augmented reality model according to the audio feature and a playing progress of the target audio data when outputting the target audio data. Compared with the current augmented reality model which lacks interactivity and is poor in usability, the image processing apparatus for augmented reality disclosed in the embodiments of the present disclosure can drive an output of the augmented reality model by combining the audio feature of the target audio data selected by the user when outputting the augmented reality model, so that the user can participate in a display process of the augmented reality model. By selecting different target audio data, the augmented reality model is driven to be displayed according to the audio feature of the target audio data, thus improving the usability.

The image processing apparatus for augmented reality provided by the embodiments of the present disclosure can implement the image processing method for augmented reality provided by any embodiment of the present disclosure, and has corresponding functional modules for executing the method and corresponding beneficial effects.

Embodiment 3

Figure 3:
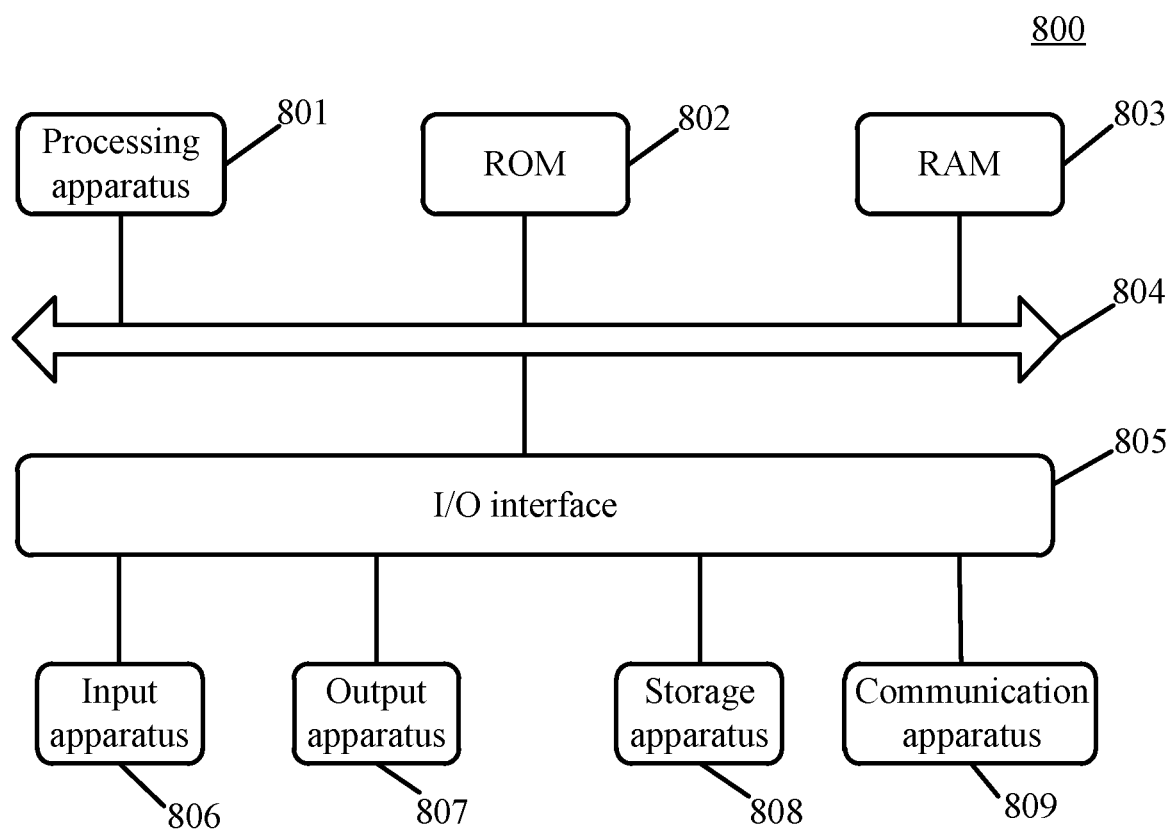
FIG. 3 is a schematic structural diagram of structure of the electronic device in the third embodiment of the present disclosure.

Refer to FIG. 3 below, which shows a schematic structural diagram of an electronic device 800 suitable for implementing Embodiment 3 of the present disclosure. The terminal device in the embodiments of the present disclosure may include, but is not limited to, a mobile terminal such as a mobile phone, a notebook computer, a digital broadcast receiver, a personal digital assistant (PDA), a portable Android device (PAD), a Portable media player (PMP)), a vehicle-mounted terminal (e.g., a vehicle-mounted navigation terminal) and the like, and a fixed terminal such as a digital TV (Television), a desktop computer, and the like. The electronic device shown in FIG. 3 is only an example, and should not bring any limitation to the functions and application scope of the embodiments of the present disclosure.

As shown in FIG. 3, the electronic device 800 may include a processing apparatus (such as a central processing unit, a graphics processor, etc.) 801, which may perform various appropriate actions and processes according to a program stored in a read only memory (ROM) 802 or a program loaded into a random access memory (RAM) 803 from a storage apparatus 808. In the RAM 803, various programs and data required for the operations of the electronic device 800 are also stored. The processing apparatus 801, the ROM 802, and the RAM 803 are connected to each other through a bus 804. An input/output (I/O) interface 805 is also connected to the bus 804.

Generally, the following devices may be connected to the I/O interface 805: an input apparatus 806 including, for example, a touch screen, a touch panel, a keyboard, a mouse, a camera, a microphone, an accelerometer, a gyroscope, and the like; an output apparatus 807 including, for example, a liquid crystal display (LCD), a speaker, a vibrator, and the like; a storage apparatus 808 including, for example, a magnetic tape, a hard disk, and the like; and a communication apparatus 809. The communication apparatus 809 may allow the electronic device 800 to perform wireless or wired communication with another device to exchange data. Although FIG. 3 shows the electronic device 800 with various devices, it should be understood that it is not required to implement or have all the devices shown. More or fewer devices may be implemented or provided instead.

Particularly, according to the embodiments of the present disclosure, the process described above with reference to the flowchart may be implemented as a computer software program. For example, an embodiment of the present disclosure includes a computer program product, which includes a computer program carried on a computer-readable medium, the computer program has program codes for executing the method shown in the flowchart. In such an embodiment, the computer program may be downloaded and installed from a network through the communication apparatus 809, or installed from the storage apparatus 808 or the ROM 802. When the computer program is executed by the processing apparatus 801, the steps in the method of the embodiments of the present disclosure are executed to realize the above functions defined.

A computer program product is provided according to one or more embodiments of the present disclosure, which includes a computer program stored in a readable storage medium, from which one or more processors of an electronic device can read the computer program, and the computer program, when executed by the one or more processors, causes the electronic device to execute the scheme provided by any one of the above embodiments.

One or more embodiments of the present disclosure provide a computer program, which is stored in a readable storage medium, from which one or more processors of an electronic device can read the computer program, and the computer program, when executed by the one or more processors, causes the electronic device to execute the scheme provided by any of the above embodiments.

It should be noted that the above computer-readable medium of the present disclosure may be a computer-readable signal medium or a computer-readable storage medium or any combination thereof. The computer-readable storage medium may be, for example, but not limited to, an electronic, magnetic, optical, electromagnetic, infrared, or semiconductor system, apparatus or device, or any combination thereof. More specific examples of the computer-readable storage medium may include, but are not limited to, an electrical connection with one or more wires, a portable computer diskette, a hard disk, a random access memory (RAM), a read-only memory (ROM), an electrically programmable read-only memory (EPROM or a flash memory), an optical fiber, a compact disc read only memory (CD-ROM), an optical storage device, a magnetic storage device, or any suitable combination of the foregoing. In the present disclosure, the computer-readable storage medium may be any tangible medium that contains or stores a program that may be used by or in connection with an instruction execution system, apparatus or device. In the present disclosure, however, the computer-readable signal medium may include a data signal propagated in baseband or as part of a carrier wave with computer-readable program codes carried thereon. This propagated data signal may take various forms, including but not limited to an electromagnetic signal, optical signal or any suitable combination thereof. The computer-readable signal medium may also be any computer-readable medium other than the computer-readable storage medium. The computer-readable signal medium may send, propagate or transport a program for use by or in connection with the instruction execution system, apparatus or device. The program codes embodied on the computer readable medium may be transmitted by any suitable medium, including but not limited to an electric wire, an optical cable, Radio Frequency (RF), etc., or any suitable combination thereof.

The above computer readable medium may be included in the electronic device; or it may exist separately without being assembled into the electronic device.

The above computer-readable medium carries one or more programs thereon, and the one or more programs, when executed by the electronic device, cause the electronic device to: acquire at least two Internet protocol addresses; send a node evaluation request including the at least two Internet protocol addresses to a node evaluation device, wherein the node evaluation device selects an Internet protocol address from the at least two Internet protocol addresses and returns the same; receive the Internet protocol address returned by the node evaluation device; wherein the acquired Internet protocol address indicates an edge node in a content distribution network.

Otherwise, the above computer readable medium carries one or more programs, and the one or more programs, when executed by the electronic device, cause the electronic device to: receive a node evaluation request including at least two Internet protocol addresses; select an internet protocol address from the at least two Internet protocol addresses; return the selected Internet protocol address; wherein the received Internet protocol address indicates an edge node in a content distribution network.

A computer program code for performing the operations of the present disclosure may be written in one or more programming languages or their combinations, including an object-oriented programming language such as Java, Smalltalk, C++, and a conventional procedural programming language such as "C" language or a similar programming language. The program code may be executed entirely on the user's computer, partly on the computer of the user, as a stand-alone software package, partly on the user's computer and partly on a remote computer, or entirely on the remote computer or server. In the case of the remote computer, the remote computer may be connected to the user's computer through any kind of network, including a local area network (LAN) or a wide area network (WAN), or may be connected to an external computer (for example, using an Internet service provider to connect through the Internet).

The flowcharts and block diagrams in the drawings illustrate an architecture, a function and an operation of a possible implementation of a system, method and computer program product according to various embodiments of the present disclosure. In this regard, each block in the flowchart or block diagram may represent a module, program segment, or part of code, which contains one or more executable instructions for implementing the specified logical function. It should also be noted that in some alternative implementations, the functions marked in the blocks may also occur in a different order than those marked in the drawings. For example, two consecutive blocks can actually be executed basically in parallel, and sometimes they may be executed in a reverse order, depending on the functions involved. It should also be noted that each block in the block diagram and/or flowchart, and a combination of the blocks in the block diagram and/or flowchart, may be implemented by a dedicated hardware-based system that performs a specified function or operation, or may be implemented by a combination of dedicated hardware and a computer instruction.

The units involved in the embodiments described in the present disclosure may be implemented by software or hardware. Among them, the name of the unit does not constitute a restriction on the unit itself in some cases. For example, the first acquisition unit may also be described as "a unit that acquires at least two Internet protocol addresses".

The above description is only preferred embodiments of the present disclosure and an explanation of the applied technical principle. It should be understood by those skilled in the art that the disclosure scope involved in the present disclosure is not limited to the technical scheme formed by a specific combination of the above technical features, but also covers other technical schemes formed by any combination of the above technical features or their equivalent features without departing from the above disclosed concept. For example, the technical scheme formed by replacing the above features with (but not limited to) technical features with similar functions disclosed in the present disclosure.

What is claimed is:

1. An image processing method for augmented reality, comprising:
   acquiring a target image in response to an image acquiring instruction triggered by a user, wherein the target image comprises a target object;
   acquiring an augmented reality model of the target object, and outputting the augmented reality model in combination with the target object, wherein the augmented reality model comprises a plurality of model units, and the plurality of model units are spliced to form the augmented reality model;
   acquiring target audio data selected by the user;
   determining an audio feature with temporal regularity according to the target audio data; and
   driving the augmented reality model according to the audio feature and a playing progress of the target audio data when outputting the target audio data,
   wherein driving the augmented reality model according to the audio feature and the playing progress of the target audio data comprises:
   driving at least part of the model units in the augmented reality model according to the audio feature and the playing progress of the target audio data.

2. The method according to claim 1, wherein determining the audio feature with temporal regularity according to the target audio data comprises:
   performing audio feature detection on the target audio data to obtain the audio feature with temporal regularity of the target audio data, wherein the audio feature comprises a combination of one or more of stress, downbeat or beat.

3. The method according to claim 1, wherein driving at least part of the model units in the augmented reality model according to the audio feature and the playing progress of the target audio data comprises:
   determining target time and a target amplitude of a morphological change of the model unit according to the audio feature with temporal regularity; and
   driving the model unit in the augmented reality model according to the target amplitude if the playing progress of the target audio data is the target time.

4. The method according to claim 3, wherein driving the model unit in the augmented reality model according to the target amplitude comprises:
   driving a preset model unit in the augmented reality model to perform a bulge action; or,
   driving a plurality of model units in the augmented reality model to perform color changing; or
   driving a plurality of model units in the augmented reality model to perform transparency changing.

5. The method according to claim 1, wherein after acquiring the target audio data selected by the user, the method further comprises:
   acquiring an emotional feature of the target audio data;
   determining a first deformation feature of the augmented reality model according to the emotional feature, wherein the first deformation feature is used to drive a shape of the augmented reality model to be consistent with emotion expressed by the emotional feature;
   driving the augmented reality model according to the first deformation feature when outputting the target audio data.

6. The method according to claim 2, wherein after acquiring the target audio data selected by the user, the method further comprises:
   acquiring an emotional feature of the target audio data;
   determining a first deformation feature of the augmented reality model according to the emotional feature, wherein the first deformation feature is used to drive a shape of the augmented reality model to be consistent with emotion expressed by the emotional feature;
   driving the augmented reality model according to the first deformation feature when outputting the target audio data.

7. The method according to claim 1, wherein after acquiring the target audio data selected by the user, the method further comprises:
   acquiring a body movement or an expression of the user;
   determining a second deformation feature of the augmented reality model according to the body movement or the expression, wherein the second deformation feature is used to drive a shape of the augmented reality model to be consistent with the body movement or the expression;
   driving the augmented reality model according to the second deformation feature when outputting the target audio data.

8. The method according to claim 2, wherein after acquiring the target audio data selected by the user, the method further comprises:
   acquiring a body movement or an expression of the user;
   determining a second deformation feature of the augmented reality model according to the body movement or the expression, wherein the second deformation feature is used to drive a shape of the augmented reality model to be consistent with the body movement or the expression;

driving the augmented reality model according to the second deformation feature when outputting the target audio data.

9. An electronic device, comprising:
one or more processors;
a storage, configured to store one or more programs,
the one or more programs, when executed by the one or more processors, cause the one or more processors to:
acquire a target image in response to an image acquiring instruction triggered by a user, wherein the target image comprises a target object;
acquire an augmented reality model of the target object and output the augmented reality model in combination with the target object, wherein the augmented reality model comprises a plurality of model units, and the plurality of model units are spliced to form the augmented reality model;
acquire target audio data selected by the user;
determine an audio feature with temporal regularity according to the target audio data; and
drive the augmented reality model according to the audio feature and a playing progress of the target audio data when outputting the target audio data;
wherein the one or more programs, when executed by the one or more processors, cause the one or more processors to:
drive at least part of the model units in the augmented reality model according to the audio feature and the playing progress of the target audio data.

10. The electronic device according to claim 9, wherein the one or more programs, when executed by the one or more processors, cause the one or more processors to:
perform audio feature detection on the target audio data to obtain the audio feature with temporal regularity of the target audio data, wherein the audio feature comprises a combination of one or more of stress, downbeat or beat.

11. The electronic device according to claim 9, wherein the one or more programs, when executed by the one or more processors, cause the one or more processors to:
determine target time and a target amplitude of a morphological change of the model unit according to the audio feature with temporal regularity;
drive the model unit in the augmented reality model according to the target amplitude if the playing progress of the target audio data is the target time.

12. The electronic device according to claim 11, wherein the one or more programs, when executed by the one or more processors, cause the one or more processors to:
drive a preset model unit in the augmented reality model to perform a bulge action; or, drive a plurality of model units in the augmented reality model to perform color changing; or
drive a plurality of model units in the augmented reality model to perform drive a plurality of model units in the augmented reality model to perform transparency changing.

13. The electronic device according to claim 9, wherein the one or more programs, when executed by the one or more processors, cause the one or more processors to:
acquire an emotional feature of the target audio data;
determine a first deformation feature of the augmented reality model according to the emotional feature, wherein the first deformation feature is used to drive a shape of the augmented reality model to be consistent with emotion expressed by the emotional feature;
drive the augmented reality model according to the first deformation feature when outputting the target audio data.

14. The electronic device according to claim 10, wherein the one or more programs, when executed by the one or more processors, cause the one or more processors to:
acquire an emotional feature of the target audio data;
determine a first deformation feature of the augmented reality model according to the emotional feature, wherein the first deformation feature is used to drive a shape of the augmented reality model to be consistent with emotion expressed by the emotional feature;
drive the augmented reality model according to the first deformation feature when outputting the target audio data.

15. The electronic device according to claim 9, wherein the one or more programs, when executed by the one or more processors, cause the one or more processors to:
acquire a body movement or an expression of the user;
determine a second deformation feature of the augmented reality model according to the body movement or the expression, wherein the second deformation feature is used to drive a shape of the augmented reality model to be consistent with the body movement or the expression;
drive the augmented reality model according to the second deformation feature when outputting the target audio data.

16. A non-transitory storage medium having computer executable instructions thereon, the computer executable instructions, when executed by a computer processor, cause the computer processor to execute the image processing method for augmented reality according to claim 1.

* * * * *